(12) United States Patent
Fowler et al.

(10) Patent No.: US 11,116,190 B2
(45) Date of Patent: Sep. 14, 2021

(54) FISHING HOOK GUIDE AND FLOAT DEFLECTOR

(71) Applicants: David Wayne Fowler, Clemmons, NC (US); Ricky Grant Fowler, Center, TX (US)

(72) Inventors: David Wayne Fowler, Clemmons, NC (US); Ricky Grant Fowler, Center, TX (US)

( * ) Notice: Subject to any disclaimer, the term of this patent is extended or adjusted under 35 U.S.C. 154(b) by 280 days.

(21) Appl. No.: 16/392,432

(22) Filed: Apr. 23, 2019

(65) Prior Publication Data
US 2020/0337284 A1    Oct. 29, 2020

(51) Int. Cl.
*A01K 83/00*     (2006.01)
*A01K 85/02*     (2006.01)
*A01K 85/10*     (2006.01)

(52) U.S. Cl.
CPC .............. *A01K 83/00* (2013.01); *A01K 85/10* (2013.01); *A01K 85/02* (2013.01)

(58) Field of Classification Search
CPC .................................................... A01K 85/02
USPC ............................................................ 43/43.2
See application file for complete search history.

(56) References Cited

U.S. PATENT DOCUMENTS

| | | | | |
|---|---|---|---|---|
| 2,892,283 A | * | 6/1959 | Hudson | A01K 93/00 43/43.4 |
| 3,331,151 A | * | 7/1967 | Turrentine | A01K 83/02 43/43.2 |
| 3,449,851 A | * | 6/1969 | Hall | A01K 97/06 43/25.2 |
| 3,768,194 A | * | 10/1973 | Murray | A01K 85/02 43/42.1 |
| 3,908,298 A | * | 9/1975 | Strader | A01K 85/02 43/42.05 |
| 4,222,194 A | * | 9/1980 | Thorvaldsen | A01K 93/00 43/41.2 |
| 4,452,003 A | * | 6/1984 | Deutsch | A01K 97/06 206/315.11 |
| 4,534,127 A | * | 8/1985 | Thorvaldsen | A01K 91/02 43/41.2 |
| 4,610,104 A | * | 9/1986 | Garcia | A01K 93/00 43/41.2 |
| 4,817,325 A | * | 4/1989 | Thomas | A01K 85/02 43/42.1 |
| 4,914,851 A | * | 4/1990 | Acker | A01K 85/02 43/42.05 |
| 5,031,350 A | * | 7/1991 | Rabideau | A01K 85/02 43/43.4 |
| 5,040,325 A | * | 8/1991 | Herrmann | A01K 85/02 43/42.36 |
| 5,661,922 A | * | 9/1997 | Bonomo | A01K 85/01 43/42.31 |
| 5,960,579 A | * | 10/1999 | Hampton | A01K 91/00 43/41.2 |
| 6,301,825 B1 | * | 10/2001 | Doreian | A01K 97/06 43/57.1 |

(Continued)

*Primary Examiner* — Christopher P Ellis
(74) *Attorney, Agent, or Firm* — Rodney B Jordan

(57) ABSTRACT

An apparatus for protecting fishermen from bait loss, entanglement of fishing rigs during casting and reel-in, and injury to fellow fishermen and bystanders. The apparatus consists of a hook enclosing float that will contain the hook and bait during casting and reel-in and release the hook to a specified depth while floating on the water.

7 Claims, 7 Drawing Sheets

(56) References Cited

U.S. PATENT DOCUMENTS

| | | | | |
|---|---|---|---|---|
| 6,519,894 B1* | 2/2003 | Geary | ............... | A01K 85/02 |
| | | | | 43/41.2 |
| 6,993,866 B1* | 2/2006 | Strange | ............ | A01K 85/01 |
| | | | | 43/42.31 |
| 7,299,582 B1* | 11/2007 | Whitehead | ......... | A01K 97/06 |
| | | | | 43/25.2 |
| 7,363,743 B2* | 4/2008 | Morken | ............ | A01K 93/00 |
| | | | | 43/44.87 |
| 2007/0157505 A1* | 7/2007 | Dodge | ............ | A01K 97/06 |
| | | | | 43/25.2 |
| 2007/0294934 A1* | 12/2007 | Myers | ............... | A01K 85/02 |
| | | | | 43/44.9 |
| 2011/0047857 A1* | 3/2011 | Miller | ............... | A01K 95/00 |
| | | | | 43/44.97 |
| 2013/0283669 A1* | 10/2013 | da Rosa | ............ | A01K 93/00 |
| | | | | 43/44.9 |
| 2015/0282465 A1* | 10/2015 | Walsh | ............... | A01K 85/01 |
| | | | | 43/42.06 |
| 2018/0360011 A1* | 12/2018 | Fletcher | ............ | A01K 83/02 |

* cited by examiner

FISHING HOOK GUIDE AND FLOAT DEFLECTOR

CROSS-REFERENCE TO RELATED APPLICATIONS

U.S. Pat. No. 6,691,448 B2 to Jones
U.S. Pat. No. 5,452,538 A to Trefiak
U.S. Pat. No. 3,224,134 A to Holcombe
U.S. Pat. No. 4,817,327 A to DeKay
US Patent number US20070294934 A1 to James Myers
US Patent number US20130283669 A1 to Joaquim da Rosa, Casey Davidson

BACKGROUND OF THE INVENTION

Fishing is one of man's oldest endeavors. Whether it be a commercial enterprise or a recreational experience, as in other endeavors, safety and ease of operation are a paramount concern. Fishing has almost always been done with the employment of a sharp hook. This brings about the possibility of injury to fingers, eyes, ears and just about every part of the fisherman's body. This has become of even greater concern as more and more people, and especially children, partake in the sport of fishing. The process of casting a hook from a fishing rod requires a large area: often too large for the safety of other participants. The whipping about of a sharp, exposed hook can present a real danger.

Another problem posed by fishing with a hook-equipped lure or baited hook is the entanglement of the hook as it is retrieved. As the hook is dragged through the water, it may snag on floating twigs, moss, mud and other debris. It is common to have live bait ripped from a hook by such debris. In such cases, there is always a mess to be cleaned from the hook before the next cast. Many times the hook will be so rigidly fastened to immovable debris that the entire hook and bait is lost. In brushy areas, a cast might go over a tree limb or bush. The hook must then be dragged over the limb or through the bush in order to retrieve it. It may be nearly impossible to retrieve the hook without snagging it on the limb or bush. Such instances are frustrating, expensive, and sometimes dangerous.

In addition to these challenges, there is the problem of safely storing the lure or hook while not in use. One common method is to attach the hook to an eyelet or some other part of the fishing pole apparatus. This is fairly effective, but the hook is still exposed and poses a danger. Also, the bait must be removed from the hook during the process.

The fact is there have been few advances in both the safety and functionality of fishing with hooks. The present invention addresses many of the prior art's shortcomings.

DESCRIPTION OF THE PRIOR ART

Apparatus designs for protecting fishing hooks, bait, and bystanders while fishing are known; however, previous designs are plagued by many problems. Among these problems are improper weight, loss of flotation due to damage, and improper shape leading to entanglement and bait lodging. The present invention addresses these deficiencies.

BRIEF DESCRIPTION OF THE DRAWINGS

FIG. 5) is an elevation view of the fishing hook guard and float deflector being reeled in.

DETAILED DESCRIPTION

Figure 1:
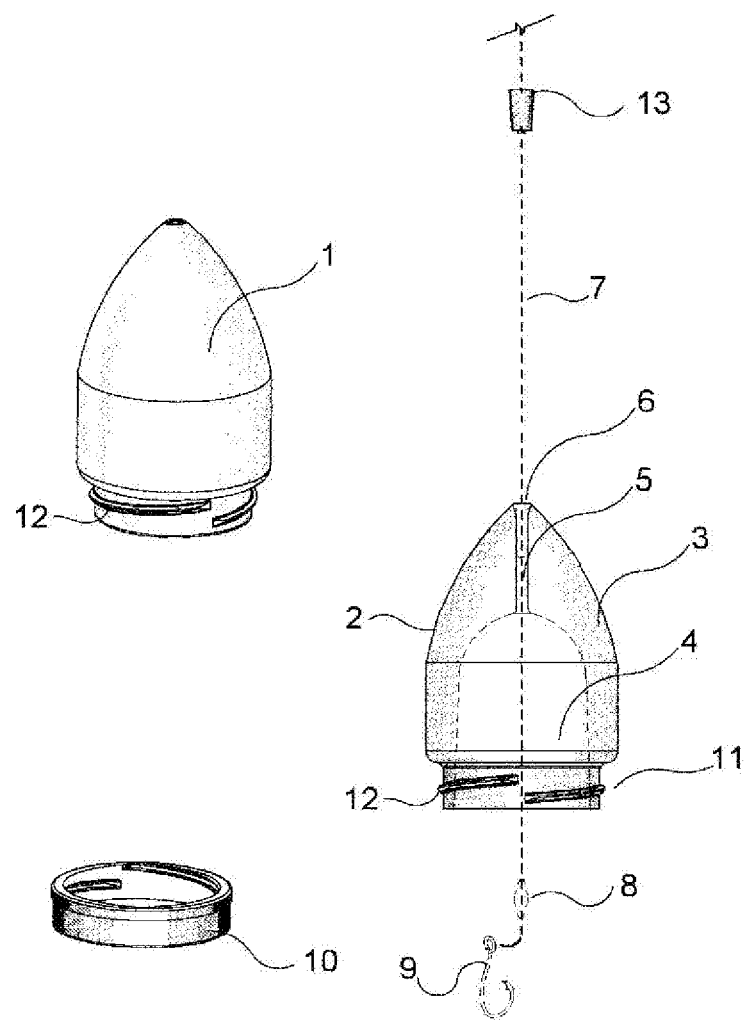
FIG. 1) is an explosion/cutaway view of the fishing hook guard and float deflector.

Referring to the figures, and more specifically to FIG. 1), it can be seen that the fishing hook guard and float detector 1 is essentially in the shape of a bullet or swollen cone. The outer cover 2 is constructed of plastic, aluminum or some other such lightweight, rigid material. The interior of the cone 1 is filled with a lightweight filler 3 such as Styrofoam. The lightweight filler 3 provides buoyancy, allowing the fishing hook guard and float detector to be used as a float or bobber for fishing. A suitably shaped and sized cavity 4 is formed within the filler material. A line passage tunnel 5 is formed from the top of the cavity 4 to the tip of the cone 6. Fishing line 7 is passed down through tunnel 5, and beyond cavity 4, where it is connected to sinker weight 8 and fishing hook 9. A jar lid-shaped bottom cap 10 may be screwed onto the bottom aperture 11 of cone 1 by way of coarse cap threads 12. As the fishing hook guard and float detector comes to rest, floating on the water's surface after casting, fishing line 7 is pulled through line passage tunnel 5, through cavity 4 and bottom cap 10 by the weight of sinker weight 8 and fish hook 9. A depth line clamp 13 is affixed to fishing line 7 at the desired place along the line above the fishing hook guard and float detector 1. As fishing hook 9 travels downward, the depth line clamp 13 comes in contact with the tip of cone 6, thereby limiting the downward travel of fishing hook 9. By changing the location of the depth line clamp 13, the depth of the hook and thus the depth at which the fisherman is fishing can be adjusted.

Figure 2:
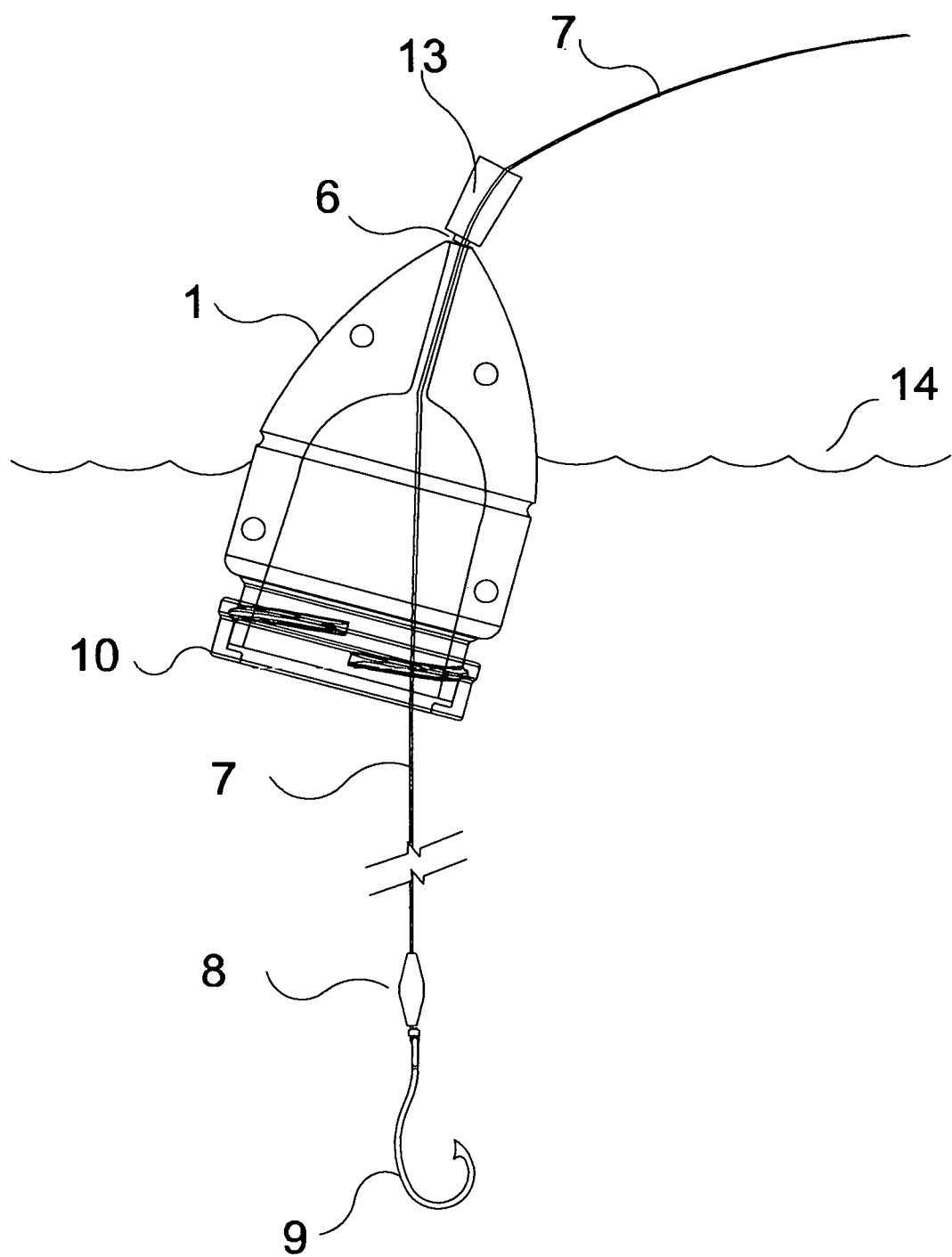
FIG. 2) is a cutaway view of the fishing hook guard and float deflector deployed for use.

FIG. 2) shows fishing hook guard and float detector 1 in use. Fishing hook guard and float detector 1 rests upon water 14. Depth line clamp 13 rests upon the tip of the cone 6, limiting hook 9 to the desired depth.

Figure 3:
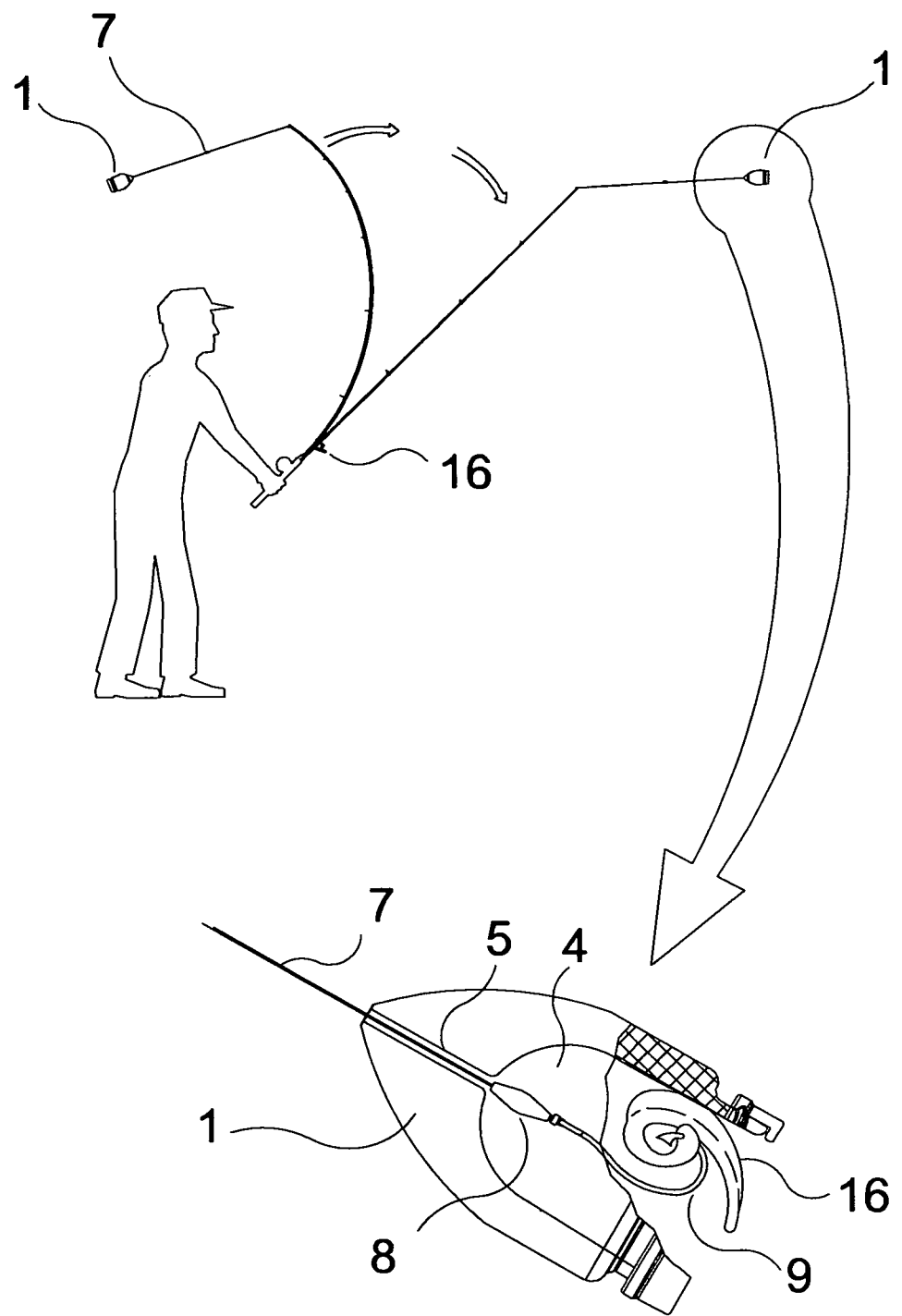
FIG. 3) is a perspective cutaway view showing the fishing hook guard and float deflector being cast.

Referring to FIG. 3), it can be seen that as the fisherman casts his rig, fishing hook guard and float detector 1 remains at the end of fishing line 7. Fishing hook guard and float detector 1 remains so positioned during the cast due to the forward force applied to the fishing rod 16 applying inertial force to the relatively heavy fishing hook guard and float detector 1. After the cast and during the travel of the rig, fishing hook guard and float detector 1 remains so positioned due to the pull of the relatively heavy fishing hook guard and float detector 1 on line 7. During both casting and the travel of the rig, the pressure is applied to sinker weight 8, which is too large to traverse tunnel 5. Hook 9 and bait 16, being affixed to the end of line 7 just below sinker weight 8, are therefore kept within cavity 4. Hook 9 and bait 16, being confined within cavity 4, are protected against snagging, dislodging, and entanglement. In addition, the safety of nearby fishermen is enhanced. When fishing hook guard and float detector 1 comes to rest upon the surface of the water, the force upon sinker weight 8 is relieved allowing hook 9 and bait 16 to fall to the preset depth set by depth line clamp 13 as in FIG. 2).

Figure 4:
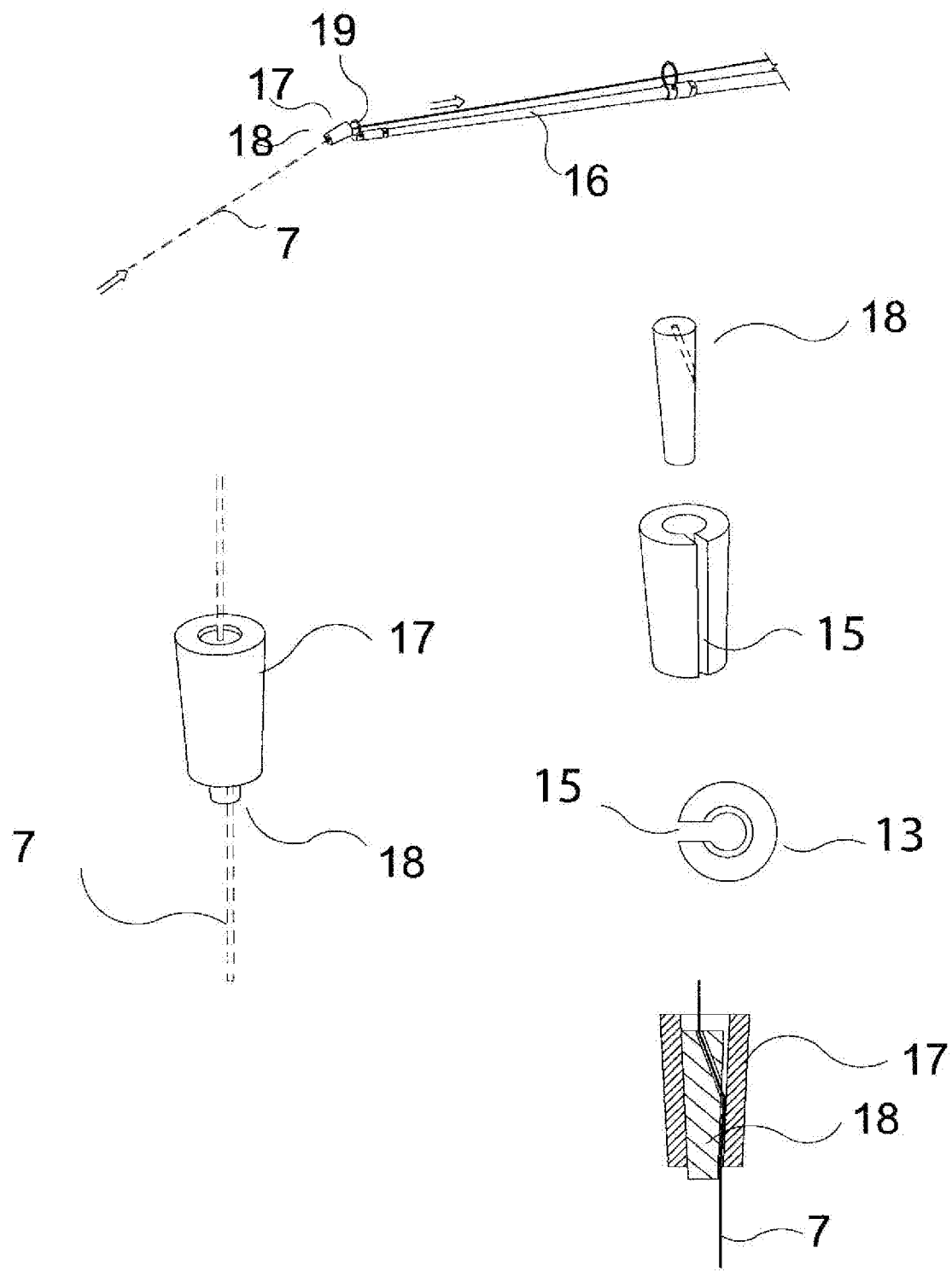
FIG. 4) is an explosion view of the depth line clamp and fishing rod.

Referring to FIG. 4), it can be seen that depth line clamp 13 comprises a tapered cylinder 17 and a similarly tapered plug 18. Fishing line 7 is threaded through tapered cylinder 17. A slit 15 is present on the side of tapered cylinder 17 in order to allow line 7 to be positioned within tapered cylinder 17 without removing other components affixed to line 7. Tapered plug 18 is pushed through tapered cylinder 17, thus wedging line 7 within tapered cylinder 17, thereby setting the line depth. There are fishing opportunities where an extreme line depth will be desired. In a case where a large amount of depth is required, depth line clamp 13 would be several feet from fishing hook 9. This would prove to be a problem if, while reeling in a fish, the depth line clamp 13 would not allow the fishing line 7 to be reeled in and fishing hook 9 to be brought closer. This problem is addressed with the ability to have fishing rod eyelet 19 loosen depth line clamp 13 when it comes into contact with fishing rod eyelet 19. This is achieved when fishing line 7 pulls on tapered plug 18 and thus moves tapered plug 18. The tapered plug 18 is formed to fit inside tapered cylinder 17 in depth line clamp 13, and is moved from a smaller opening to a larger opening within tapered cylinder 17, making the wedge loose against the fishing line, allowing the catch to be fully reeled in. The upward travel of tapered plug 18 is limited by its eventual contact with fishing rod eyelet 19, keeping depth line clamp 13 intact.

Figure 5:
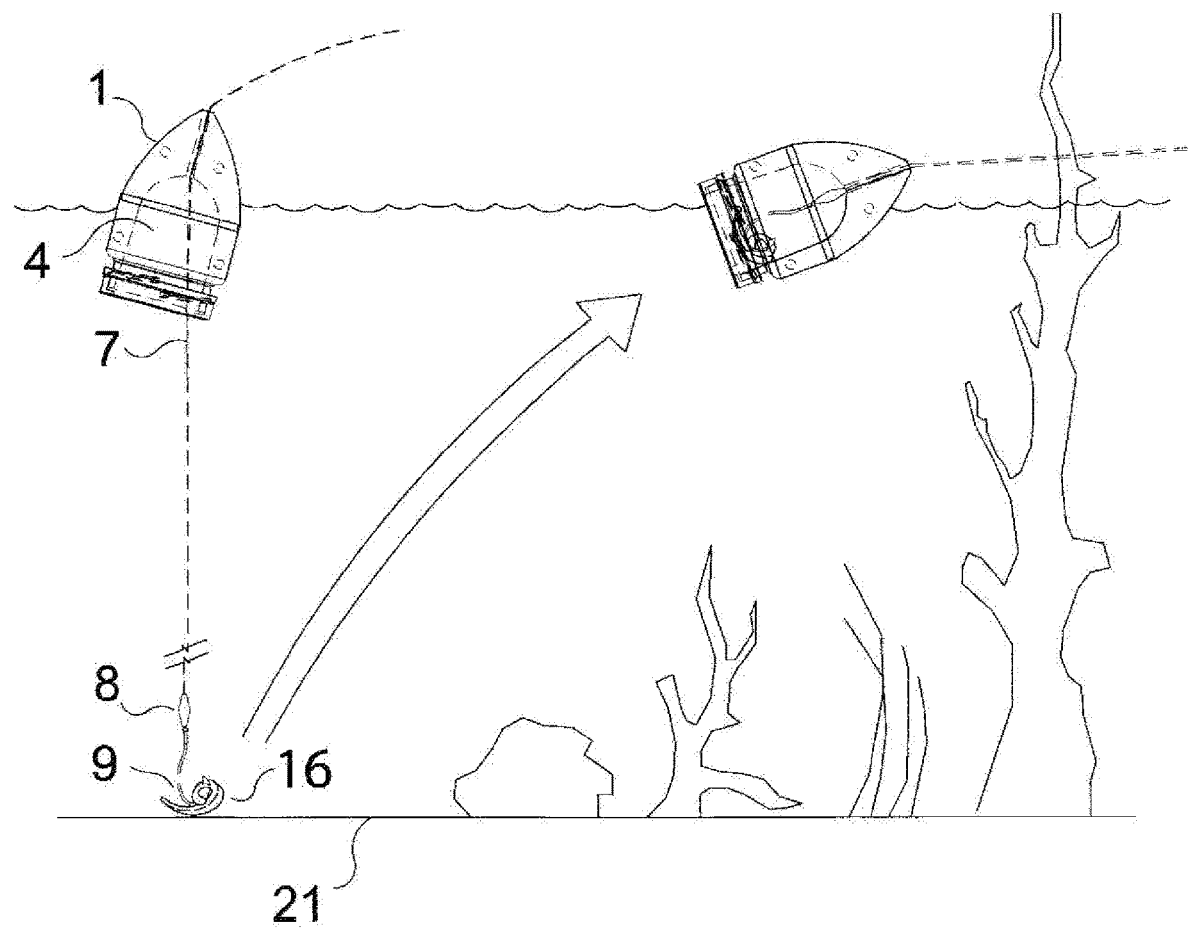

FIG. 5) provides a depiction of the basic operation of the fishing hook guard and float detector 1. As can be seen, the depth line clamp is not employed as the fisherman is bottom fishing. Even though fishing hook guard and float detector 1 is allowing fishing hook 9 and bait 16 to rest on the bottom 21, they are quickly drawn into cavity 4 as fishing hook guard and float detector 1 is reeled in, rather than allowing the fishing hook 9 and bait 16 to drag the bottom. As fishing hook guard and float detector 1 glides through the water, its bullet shape prevents it and its contents from being snagged by moss and brush.

Figure 6:
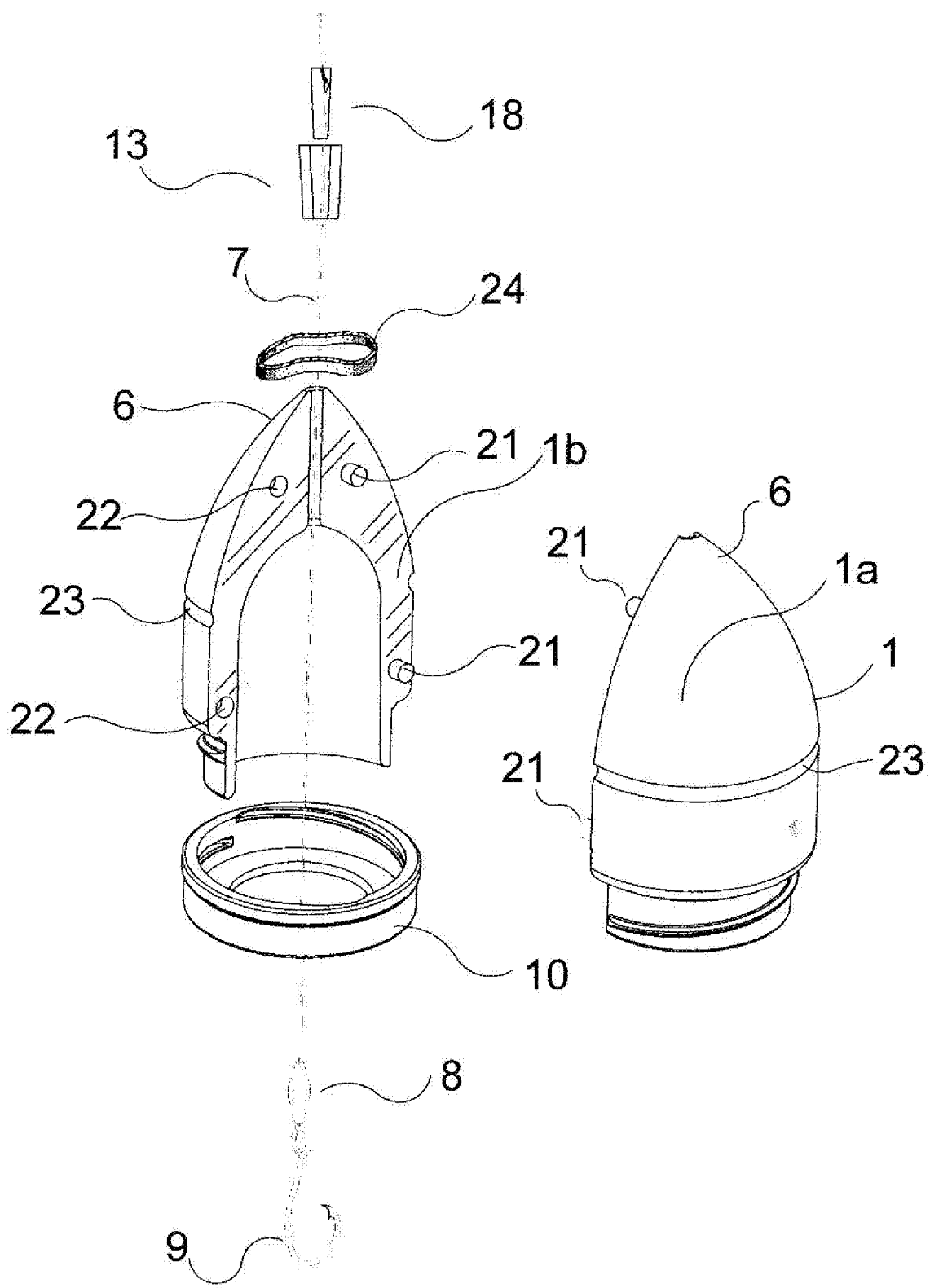
FIG. 6) is an explosion view of the fishing hook guard and float deflector in a split model design.

Referring to FIG. 6), it can be seen that the fishing hook guard and float detector 1 is presented in a split configuration. The unit is split into two equal halves, 1a and 1b. The two halves are aligned and fitted together by indexing pins 21 being fitted into corresponding holes 22. A groove 23 is present and circumferences both halves 1a and 1b so that when the halves are fitted together, groove 23 completely encircles the entire fishing hook guard and float detector 1. Elastic band 24 is forced over cone 6 and fitted into grove 23, thus holding equal halves 1a and 1b together. Equal halves 1a and 1b are also held together by bottom cap 10. The advantage gained by the ability to separate fishing hook guard and float detector 1 into two halves is so that it can be installed and removed from line 7 without removing fishing hook sinker weight 8 and fishing hook 9. This also allows for a mix-and-match process by which different patterns can be produced. These distinct patterns are useful in identifying different fishing hook guard and float detectors. Any number of methods may be employed in fastening equal halves 1a and 1b together.

Figure 7:
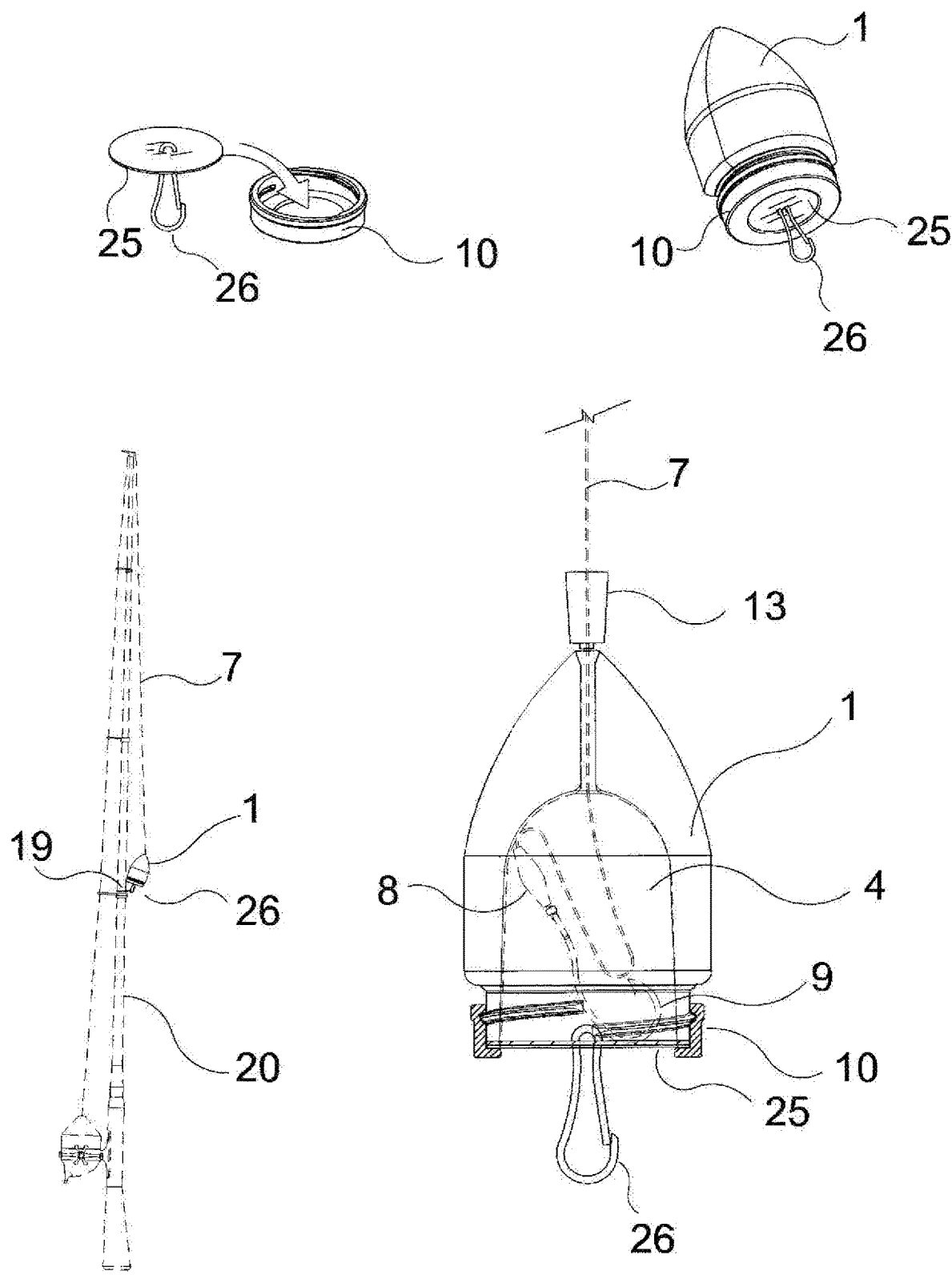
FIG. 7) is a perspective/cutaway view of the fishing hook guard and float deflector in storage, affixed to a fishing rod eyelet.

Referring to FIG. 7), it can be seen that storage plate 25 is inserted into bottom cap 10. This plate seals cavity 4 in which sinker weight 8 and fishing hook 9 are stored, thus providing safe storage. Storage plate clip 26 is pivotally affixed to storage plate 25. Storage plate clip 26 may be clipped to fishing rod eyelet 19 of fishing rod 20. Excess line slack may be reeled in, thus positioning the fishing hook guard and float detector 1 for quick storage or transportation.

We claim:
1. An apparatus for shielding a fishing hook and sinker weight assembly, said fishing weight assembly being attached to the end of a fishing line during casting and reel-in while fishing, and for storing said fishing hook and sinker weight assembly while not in use, comprising;
   a. means for shielding said fishing hook and sinker weight assembly in order to avoid entanglement of said apparatus during casting and reel-in,
   b. means for storing said fishing hook and sinker weight assembly, and
   c. means for adjusting said fishing hook's depth while fishing;
   wherein said means for adjusting said fishing hook's depth while fishing further comprises
   a tapered cylinder, said tapered cylinder having a tapered interior, said tapered interior having a larger top end and a smaller bottom end, said tapered cylinder having a longitudinal split, said split enabling the insertion of said fishing line,
   a tapered plug, said tapered plug having a small end and a larger end, said small end of said tapered plug being inserted into said larger end of said tapered interior of said tapered cylinder thus putting pressure on and affixing said fishing line,
   said fishing line being so positioned to apply tension to said tapered plug as said tapered cylinder contacts a forward mounted line guide eyelet of said fishing rod, thus pulling said tapered plug toward said larger top end of said tapered cylinder, thus releasing pressure on said fishing line traversing said tapered cylinder, thus allowing said fishing line to slide within said tapered cylinder.

2. The apparatus as described in claim 1, wherein
   said means for shielding said fishing hook and sinker weight assembly further comprises a lighter than water, bullet shaped body, said body having a forward conical shaped end, a forward tip and a bottom,
   said body further comprising a dome shaped cavity centrally located within said body, said dome shaped cavity having a forward dome apex and a bottom opening,
   said body further comprising a fishing line passage tunnel leading from said apex of said dome shaped cavity to said forward tip of said body, said fishing line traversing said fishing line tunnel,
   said fishing hook and sinker weight assembly being attached to said end of said fishing line, said fishing hook and sinker weight assembly being pulled into said cavity through said bottom opening by force applied to said fishing line.

3. The apparatus as described in claim 2, wherein
   said means for storing said fishing hook and sinker weight assembly comprises male threads at said bottom of said bullet shaped body,
   a threaded open rim cap, said open rim cap having an open center corresponding to said bottom opening of said cavity, said open rim cap being equipped with female threads,
   a storage plate, said storage plate covering said open center of said open rim cap, said open rim cap being screwed onto said bottom by way of said threads thereby sealing said dome shaped cavity and securely storing said fishing hook and sinker weight assembly.

4. The apparatus as describe in claim 3, wherein said storage plate further comprises a center mounted swivel clip connector, said swivel clip connector being fixable to one of said line guide eyelets of said fishing rod.

5. The apparatus as described in claim 1, wherein said means for avoiding entanglement of said apparatus during reel-in comprises said conical-shaped end of said bullet-shaped body.

6. The apparatus as described in claim 2, wherein said bullet shaped body further comprises two equally sized, longitudinally divided halves, said halves being removable from each other thus allowing said fishing line to be positioned to traverse said bullet shaped body without removing said fishing hook and sinker weight assembly.

7. The apparatus as described in claim 6, wherein said bullet shaped body further comprises a circumference and a latitudinally oriented groove around said circumference, said apparatus further comprising an elastic band, said elastic band being removably installed into said groove thus holding said equally sized, longitudinally divided halves together, each said equally sized, longitudinally divided half further comprising a plurality of corresponding alignment pegs and alignment peg holes, said two equally sized, longitudinally divided halves being aligned by said alignment pegs and alignment peg holes.

\* \* \* \* \*